(12) United States Patent
Uematsu et al.

(10) Patent No.: US 6,536,806 B1
(45) Date of Patent: *Mar. 25, 2003

(54) HIGH PRESSURE FUEL INJECTION PIPE

(75) Inventors: Tadahiro Uematsu, Numazu (JP); Nobuo Kato, Sunto-gun (JP)

(73) Assignee: Usui Kokusai Sangyo Kaisha Limited (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/829,747

(22) Filed: Mar. 31, 1997

Related U.S. Application Data

(63) Continuation of application No. 08/614,947, filed on Mar. 11, 1996, now abandoned, which is a continuation of application No. 08/337,316, filed on Nov. 10, 1994, now abandoned, which is a continuation of application No. 08/043,350, filed on Apr. 6, 1993, now abandoned.

(30) Foreign Application Priority Data

Apr. 9, 1992 (JP) .............................................. 4-117027

(51) Int. Cl.[7] .................................................. F16L 9/14
(52) U.S. Cl. ...................................................... 285/55
(58) Field of Search ....................... 285/45, 55; 29/516, 29/728

(56) References Cited

U.S. PATENT DOCUMENTS

| | | | | |
|---|---|---|---|---|
| 674,394 A | * | 5/1901 | Beck et al. .................... | 29/516 |
| 2,269,629 A | * | 1/1942 | Kreidel ...................... | 285/55 X |
| 3,863,328 A | * | 2/1975 | Arntz ......................... | 29/516 |
| 3,980,106 A | * | 9/1976 | Wiggins ..................... | 285/55 X |
| 3,986,734 A | * | 10/1976 | Zondag ...................... | 285/55 X |
| 4,125,924 A | * | 11/1978 | Goetze et al. ............ | 29/516 X |
| 4,289,340 A | * | 9/1981 | Press et al. ............... | 285/382.4 |
| 4,424,090 A | * | 1/1984 | Kyle ............................ | 156/89 |
| 4,556,240 A | * | 12/1985 | Yoshida ....................... | 285/55 |
| 4,601,087 A | * | 7/1986 | Kawai et al. ............. | 285/55 X |
| 4,665,876 A | * | 5/1987 | Hashimoto ................ | 285/354 X |
| 4,784,311 A | * | 11/1988 | Sugao ....................... | 29/519 X |
| 4,804,207 A | * | 2/1989 | Berchem et al. .......... | 285/55 X |
| 4,883,292 A | * | 11/1989 | Kuroki ...................... | 285/55 |
| 4,949,895 A | * | 8/1990 | Sugiyama et al. ........ | 285/55 X |
| 5,248,080 A | * | 10/1993 | Stapleton .................. | 285/55 X |

* cited by examiner

Primary Examiner—Thomas B. Will
Assistant Examiner—Kristine Markovich
(74) Attorney, Agent, or Firm—Gerald E. Hespos; Anthony J. Casella

(57) ABSTRACT

A high-pressure fuel injection pipe of doubled type, comprising: a thick outer tube; and an inner tube of made a metal and fitted in the outer tube to form a doubled pipe which is formed at its end portion with a connecting head having a face to be fitted on a seat of a mating partner. The outer tube is made of stainless steel or titanium, and the inner tube is formed of a thin metal having a high corrosion-resistance and a high strength and is doubled on the inner circumference of the outer tube throughout its entire length.

14 Claims, 2 Drawing Sheets

HIGH PRESSURE FUEL INJECTION PIPE

This application is a continuation of application Ser. No. 08/614,947, filed Mar. 11, 1996, now abandoned which is continuation of Ser. No. 08/337,316 filed Nov. 10, 1994, which is a continuation of Ser. No. 08/043,350 filed Apr. 6, 1993 now abandoned.

BACKGROUND OF THE INVENTION

1. Field of the Invention

The present invention relates to a high-pressure, fuel injection pipe having a relatively small diameter such as 15 mm or less, which is to be connected to the individual nozzle holders of a cylinder head for a fuel passage and a fuel pump.

2. Description of the Prior Art

The prior art includes a high-pressure fuel injection pipe which is doubled by fitting an inner tube of stainless steel on the inner circumference of a thick steel tube throughout the whole length, with a view to preventing cavitation erosion or corrosion (as will be shortly called the "erosion") on the inner circumference, which erosion is caused by the injection pressure of the fuel which has become higher in recent years. The pipe material thus prepared is formed at its end portion with a connecting head for providing a face to be fitted on the seat of a mating partner, thus producing the injection pipe.

In the prior art described above, the erosion on the inner circumference can be prevented by the construction of the inner tube of stainless steel fitted on the inner circumference of the thick steel pipe. However, the fitted face formed on the connecting head is not sufficiently kept away from the erosion. Especially in case of using methanol as the fuel in recent years, the fitted face is chemically corroded. On the other hand, the outer circumference is plated with zinc for preventing it from being rusted. Especially the internal combustion engine using methanol has to anticipate frequent assemblies and disassemblies for its maintenance. As a result, there arises a problem that the plated metal film is peeled or that the fitted face is damaged or deformed by the more or less forcible assembly.

SUMMARY OF THE INVENTION

The present invention has been conceived in view of the above-specified problems accompanying the prior art and has an object to provide a high-pressure fuel injection pipe which is enabled to prevent any erosion effectively not only on the inner circumference but also on the fitted face, to free the fitted face from being damaged or deformed by the forced assembly, to eliminate any plating treatment of the outer circumference of the injection pipe for the rust prevention, and to free the fitted face from any chemical corrosion even if methanol is used as the fuel, by fitting an inner tube of a highly corrosion resisting and highly strong metal on the inner circumference of a thick outer metal and by making the outer tube of a metal having a corrosion resistance, a high strength and an excellent fatigue resistance such as stainless steel or titanium.

In order to achieve the above-specified object, according to the present invention, there is provided a high-pressure fuel injection pipe of doubled type, comprising: a thick outer tube; and an inner tube of made a metal and fitted in said outer tube to form a doubled pipe which is formed at its end portion with a connecting head having a face to be fitted on a seat of a mating partner, wherein the improvement resides: in that said outer tube is made of stainless steel or titanium; and in that said inner tube is formed of a thin metal having a high corrosion-resistance and a high strength and is doubled on the inner circumference of said outer tube throughout its entire length. The metal inner tube is made of stainless steel, a nickel based alloy, titanium or a titanium alloy.

According to the present invention, the thick outer tube of stainless steel or titanium and the metal inner tube of high corrosion resistance and high strength are doubly drawn by an integral reduction, with the inner tube being loosely fitted in the inner circumference of the outer tube, so that they are diametrically reduced in their entirety and are fixedly doubled. After this, this doubled pipe is formed at its end portion with a connecting head. For these treatments, the outer tube is made of a metal having a corrosion resistance, a strength and an excellent fatigue resistance such as stainless steel or titanium, and the inner tube is made of a material having a high corrosion resistance and a high strength such as: stainless steel; a nickel based alloy such as Inconel, Incoloy or Hastelloy; titanium; or a titanium alloy. As a result, the erosion can be prevented not only on the inner circumference but also on the fitted face of the connecting head at the end portion even if an alcohol fuel having a low boiling point and liable to cause an erosion is injected under a high pressure. Moreover, the fitted face can be freed from being damaged or deformed even if the injection pipe is more or less forcibly assembled. At the same time, the outer face as the injection pipe need be neither made corrosion-resistant nor plated in the least. Moreover, not only the inner circumference but also the fitted face is freed from any chemical corrosion even if the fuel used is methanol. Thus, the connection can be stabilized and ensured for a long time, and the vibration resistance can be drastically improved to provide a injection pipe for a long use.

In case the outer tube is made of titanium, the injection pipe can find a suitable use in a marine Diesel engine which is required to have a corrosion resistance to seawater and which has its natural frequency (or resonant point) increased to have a wide range of using R.P.M. and a high load fluctuation.

BRIEF DESCRIPTION OF THE DRAWINGS

FIG. 1(*b*) is a partially cut-away side elevation showing another embodiment.

DESCRIPTION OF THE PREFERRED EMBODIMENTS

Figure 1A:
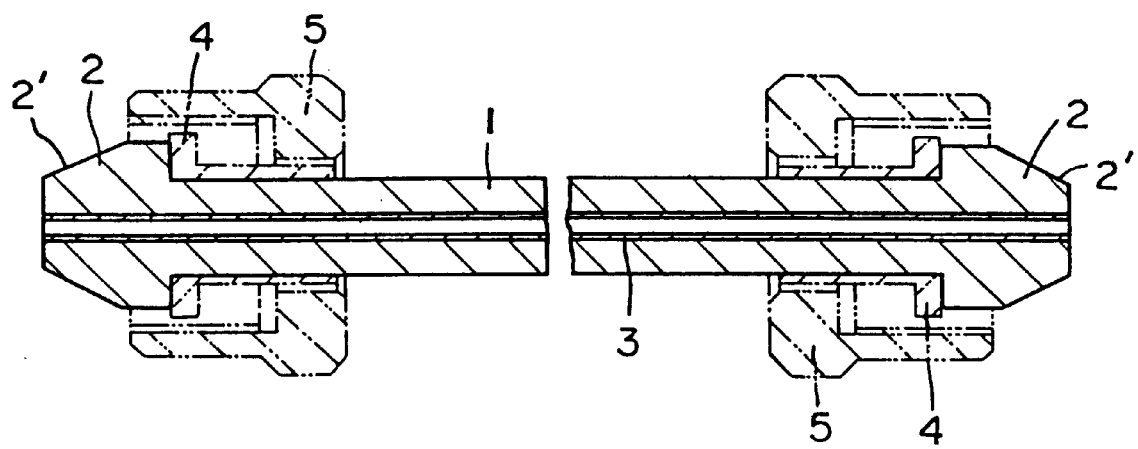
FIG. 1(*a*) is a section showing one embodiment of a high-pressure fuel injection pipe according to an embodiment of the present invention.
Figure 1B:
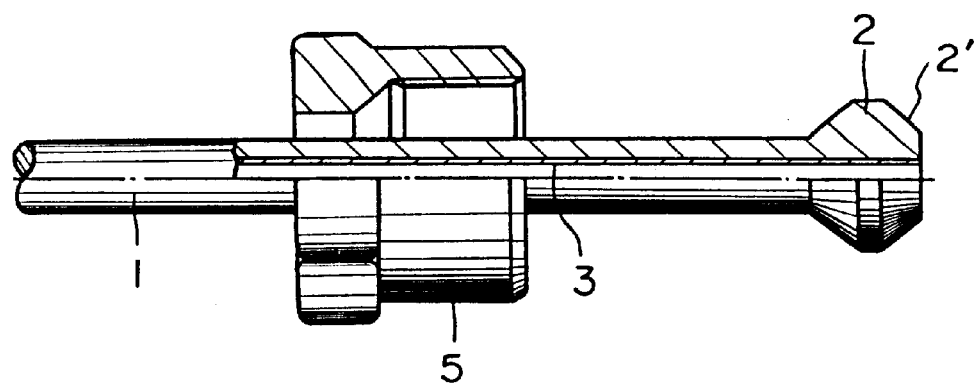
Figure 2:
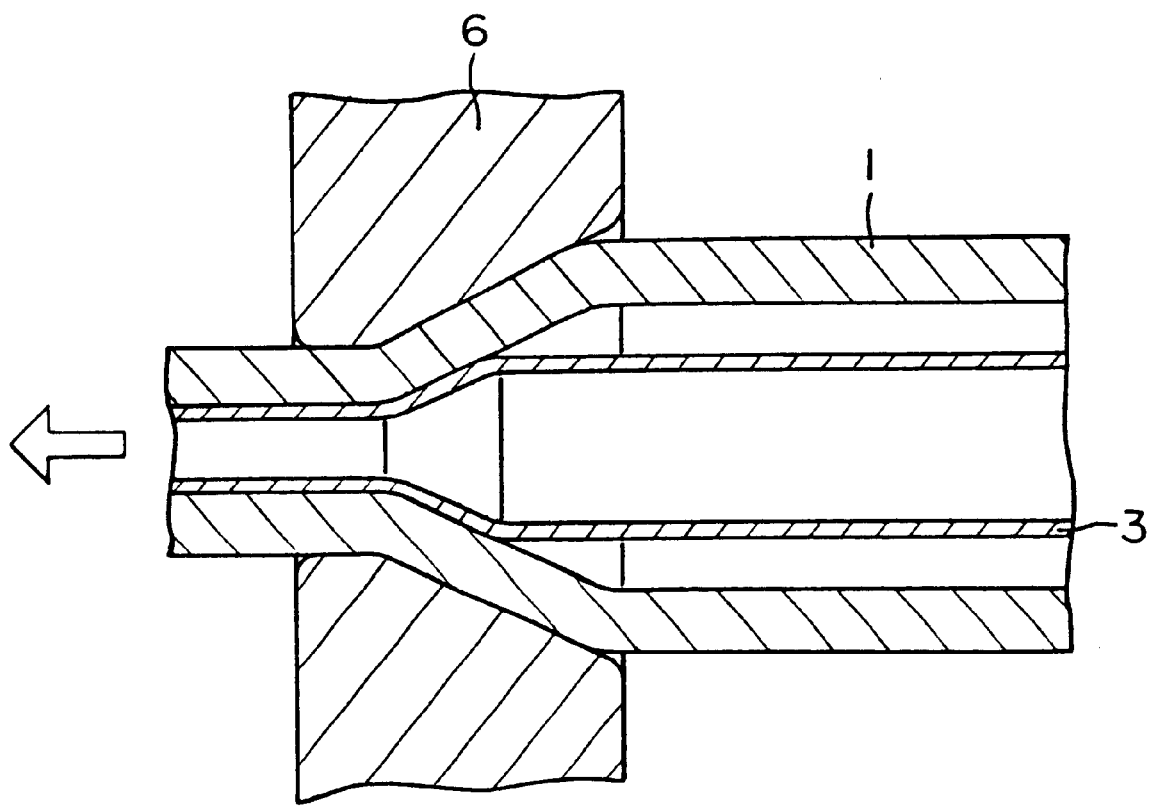
FIG. 2 is a partially cut-away longitudinal section for explaining one doubling drawing step of a method for manufacturing an injection pipe of the present invention.

The present invention will be described in the following in connection with its embodiments with reference to FIGS. 1 and 2. Designated at reference numeral 1 is an outer tube which has a thick wall and a relatively small diameter of about 15 mm or less and which is made stainless steel or titanium. In this outer tube 1, there is fitted a metal inner tube 3 which is extended throughout the whole length of the circumference of the whole of the outer tube 1 having a diameter of about 4 mm or less, to form a doubled pipe. This inner tube 3 is made of a highly corrosion resisting and highly strong metal such as: stainless steel having a thickness of about 0.3 mm to 1.2 mm; a nickel based alloy such as Inconel, Incoloy or Hastelloy; titanium; or a titanium alloy such as 6Al4V, 6Al6V2Sn, 6Al2Sn4Zr2Mo or 8Al1Mo1V. The pipe material has its end portion pressed, as customary, to form a connecting head 2 thereby to construct the high-pressure fuel injection pipe. This connecting head 2 is given a frusto-conical shape (as shown in FIG. 1(*a*)), an arcuate shape or a diamond shape (as shown in FIG. 1(*b*)).

Designated at reference numeral 4 is a sleeve washer which is fitted, if necessary, on the neck of the connecting head 2 at the end portion. At the same time, there is assembled with the back of the sleeve washer 4 a fastening nut 5 for fastening the connecting head 2 into abutment against with the seat of a mating injection nozzle injection holder or the like (although not shown).

EXAMPLE 1

An outer tube of SUS304 (having an external diameter of 15.0 mm, an internal diameter of 10.2 mm and a thickness of 2.4 mm) was cleaned by a pretreatment and cut to a length of 3,200 mm. A metal inner tube of SUS304 (having an external diameter of 9.0 mm, an internal diameter of 7.8 mm and a thickness of 0.6 mm) was also cleaned by a pretreatment and cut to a length of 3,200 mm. The inner tube.thus prepared was inserted and fitted in the outer tube. Next, as shown in FIG. 2, a fixed die 6 was used to perform a doubling drawing two times by an integral reduction in one direction, as indicated by arrow, to reduce the entire assembly diametrically of its whole length. After this, a correction was performed to manufacture an injection pipe material having an external diameter of 8.0 mm, an internal diameter of 2.8 mm, a thickness of 2.6 mm and a hardness of about 350 Hv at its inner circumference. After this, the injection pipe material was cut to a product length of 750 mm. This injection pipe was pressed at its end portion to form a frusto-conical connecting head (having an external diameter of 11.5 mm, a height of 7.0 mm and an angle of cone of 58 degrees). Then, the product including its face to be fitted was bent with the metal outer tube covering, to produce the fuel injection pipe.

EXAMPLE 2

An outer tube of SUS304 (having an external diameter of 12.0 mm, an internal diameter of 7.0 mm and a thickness of 2.5 mm) and an inner tube of Inconel 601 (having an external diameter of 6.8 mm, an internal diameter of 5.8 mm and a thickness of 0.5 mm) were subjected to the pretreatment of Example 1 and were cut to an equal length. Those outer tube and inner tube were subjected to a treatment similar to that of Example 1 to produce an injection pipe material having an external diameter of 7.0 mm, an internal diameter of 2.2 mm, a thickness of 2.4 mm and a hardness of about 380 Hv at its inner circumference.

After this, a connecting head was formed like Example 1, and the intermediate product was bent to produce a fuel injection pipe.

EXAMPLE 3

An outer tube of pure titanium (having an external diameter of 9.3 mm, an internal diameter of 5.3 mm and a thickness of 2.0 mm) was cleaned by a pretreatment and cut to a length of 2,000 mm. A metal inner tube of a titanium alloy 6Al4V (having an external diameter of 4.5 mm, an internal diameter of 3.5 mm and a thickness of 0.5 mm) was also cleaned by a pretreatment and cut to a length of 2,500 mm. The inner tube thus prepared was inserted and fitted in the outer tube. Next, as shown in FIG. 2, the fixed die 6 was used to perform a doubling drawings two times by an integral reduction in one direction, as indicated by arrow, to reduce the entire assembly diametrically of its whole length. After this, a correction was performed to manufacture an injection pipe material having an external diameter of 6.4 mm, an internal diameter of 2.0 mm, a thickness of 2.2 mm and a hardness of about 340 Hv at its inner circumference. After this, the injection pipe material was cut to a product length of 830 mm. This injection pipe was pressed at its end portion to form a diamond-shaped connecting head (having an external diameter of 8.7 mm, a height of 4.8 mm and an angle of cone of 58 degrees). Then, the product including its face to be fitted was bent with the metal outer tube covering, to produce the fuel injection pipe.

EXAMPLE 4

An outer tube of pure titanium and an inner tube of pure titanium, both having an equal size and cut to an equal length to those of Example 3, were subjected to the pretreatment of Example 3 and then to a treatment similar to that of Example 3 to produce an injection pipe material having an external diameter of 6.4 mm, an internal diameter of 2.0 mm, a thickness of 2.2 mm and a hardness of about 280 Hv at its inner circumference.

After this, a connecting head was formed like Example 3, and the intermediate product was bent to produce a fuel injection pipe.

EXAMPLE 5

An outer tube of SUS316 (having an external diameter of 10.0 mm, an internal diameter of 5.5 mm and a thickness of 2.25 mm) was cleaned by a pretreatment and cut to a length of 2,300 mm. A metal inner tube of Hastelloy C-276 (having an external diameter of 4.8 mm, an internal diameter of 3.8 mm and a thickness of 0.5 mm) was also cleaned by a pretreatment and cut to a length of 3,000 mm. The inner tube thus prepared was inserted and fitted in the outer tube. Next, as shown in FIG. 2, a fixed die 6 was used to perform a doubling drawings two times by an integral reduction in one direction, as indicated by arrow, to reduce the entire assembly diametrically of its whole length. After this, a correction was performed to manufacture an injection pipe material having an external diameter of 7.0 mm, an internal diameter of 2.2 mm, a thickness of 2.4 mm and a hardness of about 390 Hv at its inner circumference. After this, the injection pipe material was cut to a product length of 1080 mm. This injection pipe was pressed at its end portion to form a frusto-conical connecting head (having an external diameter of 9.5 mm, a height of 4.0 mm and an angle of cone of 58 degrees). Then, the product including its face to be fitted was bent with the metal outer tube covering, to produce the fuel injection pipe.

EXAMPLE 6

An outer tube of SUS316 and an inner tube of pure titanium were subjected to the pretreatment of Example 5 and were cut to an equal size and an equal length to those of Example 5. Those outer tube and inner tube were subjected to a treatment similar to that of Example 5 to produce an injection pipe material having an external diameter of 7.0 mm, an internal diameter of 2.2 mm, a thickness of 2.4 mm and a hardness of about 270 Hv at its inner circumference.

After this, a connecting head was formed like Example 5, and the intermediate product was bent to produce a fuel injection pipe.

The six samples thus produced according to the above-described six Examples and one injection pipe of the prior art having an inner tube of stainless steel fitted in a thick steel tube were prepared and were run in a special mode with 100% of methanol. The states after the run of 1,200 hours were observed.

As a result, in the pipe of the prior art, a leakage due to erosion and rust were observed on the face to be fitted. In any of the Examples of the present invention, on the contrary, neither the leakage due to erosion nor the rust was observed.

Even in case the high-pressure fuel injection pipe according to the present invention is used to inject such a fuel, e.g., alcohol fuel under a high pressure as has a low boiling point and will cause erosion, this erosion can be prevented not only on the inner circumference of the injection pipe but also on a face 2' to be fitted on the mating seat. Moreover, the face to be fitted can be free from being damaged or deformed even by a forced fitting. At the same time, the injection pipe need not have its outer circumference subjected to a rust-preventing or plating treatment. Even if methanol is used as the fuel, the face 2' to be fitted is freed from any chemical corrosion, and the connection can be stabilized and ensured to improve the vibration or fatigue resistance. Thus, the fuel injection pipe of the present invention can be used for a long time.

What is claimed is:

1. A high-pressure fuel injection pipe comprising:
    a thick-walled outer tube unitarily formed of stainless steel and including opposed longitudinal ends, an inner surface of substantially constant inside diameter along the length of said outer tube, an outer surface defining an outside diameter of not more than 15 mm along a major portion of the outer tube, said outer tube being thicker adjacent at least one said longitudinal end to define an enlarged connecting head with a face configured for engagement with a mating partner;
    an inner tube unitarily made of a thin metal having a high corrosion resistance and a high strength, said inner tube being disposed within said outer tube and extending along the entire length of said outer tube, said inner and outer tubes being doubly drawn for simultaneous integral reduction of both said inner and outer tubes, such that an abutting fixed engagement that is free of welds is defined between the inner circumferential surface of said outer tube and said inner tube along the entire length of said outer tube without heat treating said tubes.

2. A high-pressure fuel injection pipe according to claim 1, wherein said metal inner tube is made of a metallic material selected from the group consisting of stainless steel, a nickel-based alloy, titanium and a titanium alloy.

3. A high-pressure fuel injection pipe according to claim 2, wherein said nickel based alloy is selected from the group consisting of Inconel, Incoloy and Hastelloy.

4. A high-pressure fuel injection pipe according to claim 1, wherein said connecting head has a frusto-conical shape.

5. A high-pressure fuel injection pipe comprising:
    a thick-walled outer tube unitarily formed of titanium and including opposed longitudinal ends, an inner surface of substantially constant inside diameter along the length of said outer tube, an outer surface defining an outside diameter of not more than 15 mm along a major portion of the outer tube, said outer tube being thicker adjacent at least one said longitudinal end to define an enlarged connecting head with a face configured for engagement with a mating partner;
    an inner tube unitarily made of a thin metal having a high corrosion resistance and a high strength, said inner tube being disposed within said outer tube and extending along the entire length of said outer tube, said inner and outer tubes being doubly drawn for simultaneous integral reduction of both said inner and outer tubes, such that an abutting fixed engagement that is free of welds is defined between the inner circumferential surface of said outer tube and said inner tube along the entire length of said outer tube without heat treating said tubes.

6. A high-pressure fuel injection pipe according to claim 5, wherein said metal inner tube is made of a metallic material selected from the group consisting of stainless steel, a nickel-based alloy, titanium and a titanium alloy.

7. A high-pressure fuel injection pipe according to claim 6, wherein said titanium alloy is selected from the group consisting of 6A14V, 6A16V2Sn, 612Sn4Zr2Mo and 8A11Mo1V.

8. A high-pressure fuel injection pipe according to claim 6, wherein said nickel based alloy is selected from the group consisting of Inconel, Incoloy and Hastelloy.

9. A high-pressure fuel injection pipe according to claim 5, wherein said connecting head has a frusto-conical shape.

10. A high-pressure fuel injection pipe according to claim 5, further comprising a sleeve washer fitted on portions of the outer surface of said outer tube adjacent said connecting head.

11. A high-pressure fuel injection pipe which consists essentially of:
    a thick-walled outer tube unitarily formed of titanium and including opposed longitudinal ends, an inner surface of substantially constant inside diameter along the length of said outer tube, an outer surface defining an outside diameter of not more than 15 mm along a major portion of the outer tube, said outer tube being thicker adjacent at least one said longitudinal end to define an enlarged connecting head with a face configured for engagement with a mating partner; and
    an inner tube unitarily made of a thin tube of titanium or stainless steel and a high strength, said inner tube being disposed within said outer tube and extending along the entire length of said outer tube, said inner and outer tubes consisting essentially of an inner and an outer tube which are doubly drawn for simultaneous integral reduction of both said inner and outer tubes, such that an abutting fixed engagement that is free of welds is defined between the inner circumferential surface of said outer tube and said inner tube along the entire length of said outer tube without heat treating said tubes.

12. A high-pressure fuel injection pipe which consists essentially of:
    a thick-walled outer tube unitarily formed of titanium and including opposed longitudinal ends, an inner surface of substantially constant inside diameter along the length of said outer tube, an outer surface defining an outside diameter of not more than 15 mm along a major portion of the outer tube, said outer tube being thicker adjacent at least one said longitudinal end to define an enlarged connecting head with a face configured for engagement with a mating partner; and
    an inner tube unitarily made of a tube of stainless steel or titanium having a high corrosion resistance and a high strength, said inner tube being disposed within said outer tube and extending along the entire length of said outer tube, said inner and outer tubes consisting essentially of an inner and an outer tube which are doubly drawn for simultaneous integral reduction of both said inner and outertubes, such that an abutting fixed engagement that is free of welds is defined between the inner circumferential surface of said outertube and said innertube along the entire length of said outer tube without heat treating said tubes.

13. A high-pressure fuel injection pipe which consists of:

a thick-walled outer tube unitarily formed of stainless steel and including opposed longitudinal ends, an inner surface of stainless steel or titanium substantially constant inside diameter along the length of said outer tube, an outer surface defining an outside diameter of not more than 15 mm along a major portion of the outer tube, said outer tube being thicker adjacent at least one said longitudinal end to define an enlarged connecting head with a face configured for engagement with a mating partner; and an inner tube unitarily made of a thin metal having a high corrosion resistance and a high strength, said inner tube being disposed within said outer tube and extending along the entire length of said outertube, said inner and outer tubes consisting essentially of an inner and an outer tube which are doubly drawn for simultaneous integral reduction of both said inner and outer tubes, such that an abutting fixed engagement that is free of welds is defined between the inner circumferential surface of said outer tube and said inner tube along the entire length of said outer tube without heat treating said tubes.

14. A high-pressure fuel injection pipe which consists of:

a thick-walled outer tube unitarily formed of stainless steel and including opposed longitudinal ends, an inner surface of titanium or stainless steel of substantially constant inside diameter along the length of said outer tube, an outer surface defining an outside diameter of not more than 15 mm along a major portion of the outer tube, said outer tube being thicker adjacent at least one said longitudinal end to define an enlarged connecting head with a face configured for engagement with a mating partner; and an inner tube unitarily made of a thin metal having a high corrosion resistance and a high strength, said inner tube being disposed within said outer tube and extending along the entire length of said outer tube, said inner and outer tubes consisting essentially of an inner and an outer tube which are doubly drawn for simultaneous integral reduction of both said inner and outer tubes, such that an abutting fixed engagement that is free of welds is defined between the inner circumferential surface of said outer tube and said inner tube along the entire length of said outer tube without heat treating said tubes.

* * * * *